Patented Jan. 23, 1923.

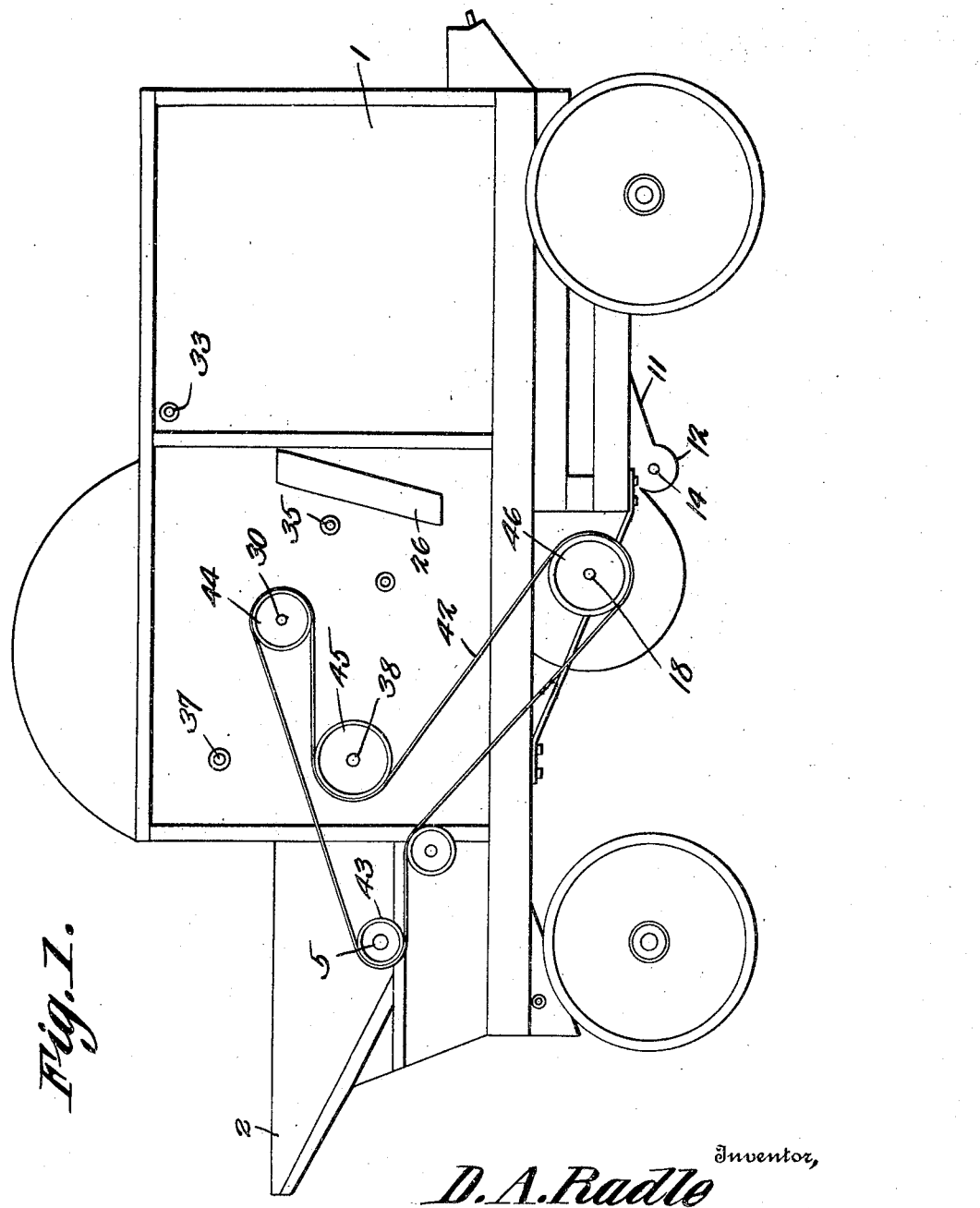

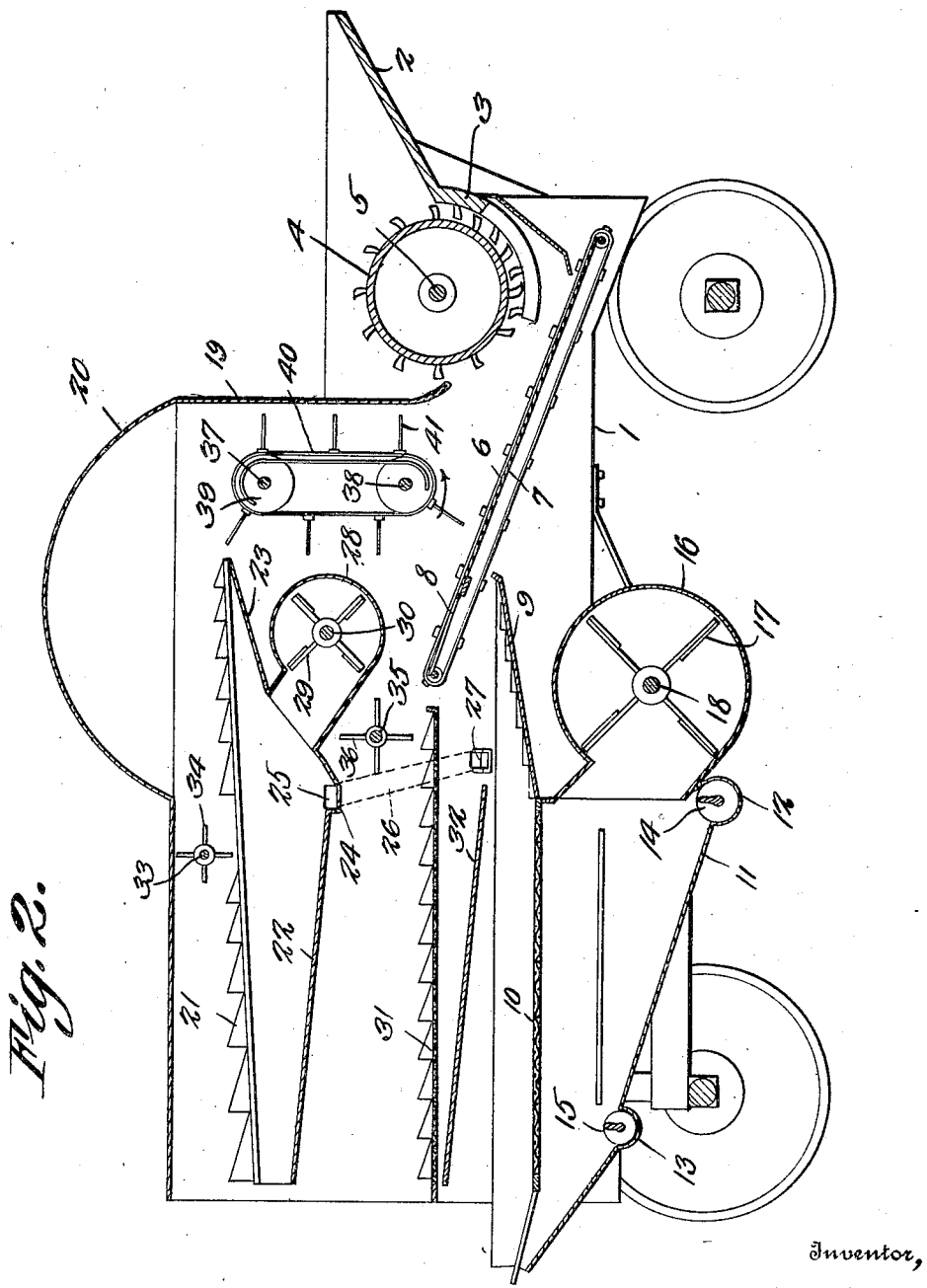

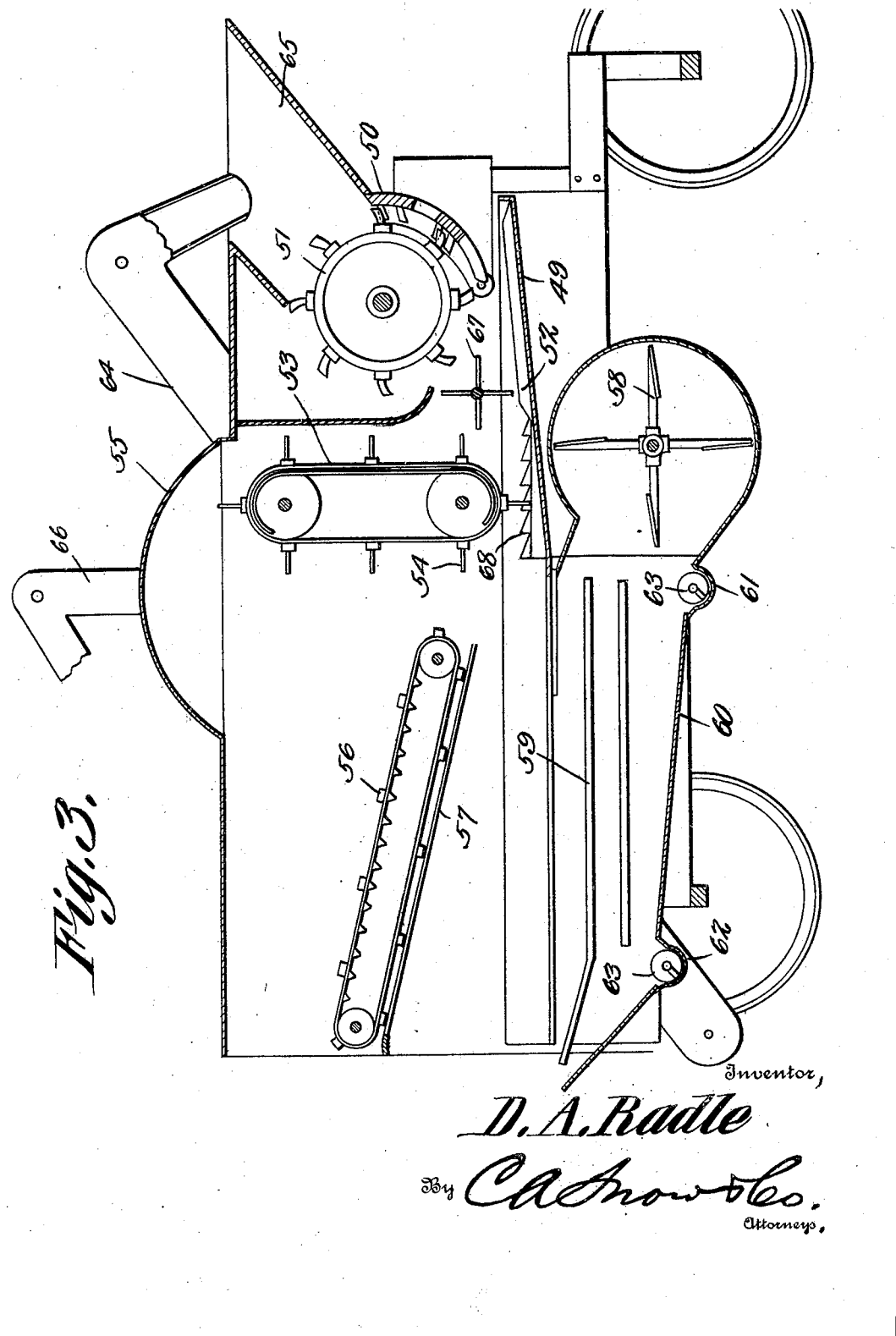

1,443,241

UNITED STATES PATENT OFFICE.

DON A. RADLE, OF OKLAHOMA, OKLAHOMA.

THRASHING MACHINE.

Application filed March 5, 1921. Serial No. 450,038.

*To all whom it may concern:*

Be it known that I, DON A. RADLE, a citizen of the United States, residing at Oklahoma city, in the county of Oklahoma and State of Oklahoma, have invented a new and useful Thrashing Machine, of which the following is a specification.

This invention relates to thrashing machines one of its objects being to combine with a raddle an endless pick up device whereby the bulk of the straw delivered from the thrashing cylinder is conveyed upwardly to a straw rack in the upper portion of the machine, thus preventing the lower portion of the machine from becoming choked and allowing the grain to travel freely through the machine.

Another object is to provide a machine of this character the mechanism of which imparts an abrupt reverse motion to the straw while being thrown backwardly by the thrashing cylinder, the grain passing down through the bars of the raddle while the straw is thrown against the top of the machine and deflected onto a rack.

A further object is to so handle the straw that it will become slightly compressed while being picked up from the raddle but is permitted to expand thereafter and is turned over, thus to completely free the grain loosened by the successive compression and expansion of the straw.

A still further object is to utilize a grain pan mounted for vibration and so constructed as to deflect the grain laterally under the straw while the straw is being directed to the pick up device.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred forms of the invention have been shown.

In said drawings—

Figure 1 is a side elevation of the thrashing machine.

Figure 2 is a vertical longitudinal section therethrough.

Figure 3 is a section showing a modified form of machine.

Referring to the figures by characters of reference 1 designates a wheel supported housing provided with the usual feed hopper 2 at the outlet of which is mounted a thrashing concave 3. The thrashing cylinder has been indicated at 4, its shaft being designated at 5.

Extending upwardly and rearwardly from under the concave is an endless carrier or raddle 6 the upper flight of which passes over an inclined pan 7 from the upper end of which projects fingers 8. These fingers overhang a downwardly inclined rack 9 from the lower end of which projects a screen 10 which overhangs a grain board 11. Transverse troughs 12 and 13 are formed in this board at the lower end thereof and an intermediate point and mounted within the troughs are transverse screw conveyors 14 and 15 respectively.

A fan housing 16 is arranged under the rack 9 and has a blower 17 therein secured to a shaft 18. This blower is adapted to direct an air blast upwardly through the screen 10 and out from the rear portion of the machine.

The top of the housing 1 has an upstanding wall 19 forming the back of the hopper 2 and the upper end of this wall merges into an arched top wall 20 which overhangs a straw rack 21 supported in the upper portion of the housing. This straw rack overhangs inclined grain boards 22 and 23 which converge downwardly to a laterally inclined trough 24 having an end outlet 25 opening through the side of the housing into a downwardly extending spout 26. This spout, in turn, delivers through the side of the housing onto the straw rack 9, as shown at 27.

A blower housing 28 is arranged in the housing and discharges through the inclined board 23 so that the blower 29, which is mounted on a transverse shaft 30, will direct an air blast upwardly through the rack 21 and against the back portion of the top of the housing.

A straw rack 31 is extended rearwardly above the rack 9 and screen 10 and from a point adjacent the upper end of the raddle 6, there being an inclined grain board 32 under this rack 31 for directing the grain from the rack 31 backwardly toward the rack 9.

A transverse shaft 33 is located above the rack 31 and carries beater arms 34 and another transverse shaft 35 is located above the back end of the rack 31 and carries beater arms 36.

Arranged within the front portion of the housing and above the raddle 6 are superposed shafts 37 and 38 carrying wheels 39 or the like on which is mounted an endless elevator 40 having outwardly extending pick up fingers 41 adapted, during their upward movement, to travel close to the wall 19 and also adapted successively to move close to the raddle as will be apparent by referring to Figure 2.

Any suitable mechanism may be provided for driving the parts herein described and some of this mechanism has been shown in Figure 1 wherein an endless belt 42 transmits motion from a pulley 43 on the shaft 5 to a pulley 44 on the shaft 30 and thence to a pulley 45 on shaft 38 and a pulley 46 on shaft 18. Other means, not shown, may be employed at the other side of the machine for driving the other shaft.

When material is placed in the hopper 2 it is thoroughly threshed as ordinarily between the cylinder 4 and the concave 3 and the cylinder throws this material rearwardly along the raddle 6 which operates to convey the grain rearwardly. The grain that is released from the straw will be discharged onto the rack 9 while the lower strata of the straw on the raddle will move past the fingers 8 and onto the rack 31, the beater 36 engaging and agitating the straw as it passes onto the rack. Here another separation of grain and straw takes place, the straw passing out from the rear end of the machine while the grain falling through the rack will be deposited on the board 32 and gravitate to the rack 9 and the screen 10.

The greater portion of the straw delivered from the cylinder 4 is thrown straight back and its motion is promptly reversed by the pick up fingers 41 which are moving in the direction indicated by the arrow in Figure 2. This results in shaking a lot of the grain from the straw so that it can be conducted to the rack 9 as before explained. The straw engaged by the pick up fingers will be carried upwardly along the wall 19 and will subsequently be thrown upwardly by the rapidly moving pick up fingers, so as to strike the arched top 20. The lower end of the wall 19 is curved toward the cylinder 4 and cooperates with the elevator 40 to form a contracting throat so that, when the straw is picked up by the fingers and pulled into the space between the elevator and the wall 19 it will be compressed. The top will deflect the straw rearwardly onto the rack 21, the straw being turned during this operation so that after the straw has passed under the beater 34 and over the rack 21 the separation of straw and grain will be completed. The grain will gravitate to the trough 24 and flow downwardly to the rack 9. As the grain drops from the rack 21 and from the rack 9 it will pass through the air blasts set up by the blowers 29 and 17 so that all chaff and other light particles mixed with the grain will be blown out of the machine.

In Figure 3 a greatly simplified structure has been shown. In this form of device the grain pan 49 is inclined downwardly and rearwardly from under the concave 50 and cylinder 51 and is provided on its upper face with an obliquely disposed rib 52 whereby grain falling onto the pan will be deflected toward one side thereof while the straw thrown by the cylinder 51 will move straight back against the endless elevator 53 in the path thereof and the pick up fingers 54 of which will carry the straw upwardly and throw it against the arcuate top section 55 from which it will be deflected downwardly onto the raddle or conveyor 56 operating above the inclined grain board 57. A blower 58 operates to direct an air blast upwardly through the screens indicated generally at 59, thus to remove the chaff. A grain board 60 is provided for directing the grain to troughs 61 and 62 in which are arranged worm conveyors 63. One trough, 62, is adapted to direct the grain into an elevator 64 which returns the grain and the particles mixed therewith to the feed hopper 65. Another elevator 66 is employed for conveying the grain from the trough 61 away from the machine.

If the machine is used for thrashing in arid sections of the grain producing regions, it can be provided, in addition to the parts illustrated in Figure 3, with a beater 67 located between the lower portion of the elevator 53 and the cylinder 51, this beater rotating at less speed than the cylinder. Thus the cylinder is prevented from throwing too great an amount of fine or broken straw through the rakes or fingers of the elevator 53. "Fish backs" 68 preferably made of sheet steel can be arranged under the elevator 53 and the fingers on the elevator are adapted to move between said "fish backs" so that the short broken straws can be lifted therefrom.

What is claimed is:—

1. In a thrashing machine the combination with a thrashing cylinder and concave, of a rack, and means adjacent the concave for receiving the material as ejected from the concave, and means working between the rack and the cylinder for picking up the straw from said receiving means and projecting it upwardly and onto the rack.

2. In a thrashing machine the combination with a cylinder and concave, of superposed separating means, a grain pan extending from under the concave and cylinder for delivering grain to the lower separating means, a deflector overhanging the upper separating means, and means for abruptly reversing the movement of straw propelled rearwardly over the grain pan and elevating said straw from the grain pan and against the deflecting means and onto the upper separating means.

3. In a thrashing machine the combination with a cylinder and concave and a grain pan extending rearwardly from under the same, of means above the grain pan for abruptly reversing the movement of straw thrown by the cylinder, conveying the straw upwardly from the grain pan, and successively compressing the straw and releasing it for expansion during the upward movement thereof.

4. In a thrashing machine the combination with a cylinder and concave and a grain pan extending rearwardly therefrom, of superposed separating means, said grain pan delivering to the lower separating means, means for picking up a portion of the straw from the pan and straw thrown rearwardly by the cylinder and conveying it upwardly, and a deflector for engagement by the elevated straw for directing the straw onto the upper separating means and for turning the straw.

5. In a thrashing machine the combination with a cylinder and concave and a grain pan extending rearwardly from under the same, of means above the grain pan for abruptly reversing the movement of the straw thrown by the cylinder, conveying the straw upwardly, and successively compressing the straw and releasing it for expansion during the upward movement thereof, a beater interposed between the lower portion of said means and the cylinder and rotating at a slower speed than the cylinder for controlling the movement of fine or broken straw towards said means, and a "fish back" carried by the pan and extending between the paths of the straw engaging portions of said means.

In testimony that I claim the foregoing as my own, I have hereto affixed my signature in the presence of two witnesses.

DON A. RADLE.

Witnesses:
W. B. NORCH,
S. W. KENYON.